(12) United States Patent
Kuhl et al.

(10) Patent No.: US 6,291,071 B1
(45) Date of Patent: Sep. 18, 2001

(54) BONDED COMPOSITE STRUCTURE AND ITS FABRICATION

(75) Inventors: Paul C. Kuhl, Vista; Rudy Cesena, Poway, both of CA (US); Don J. Bridges, Mesa, AZ (US); Edward S. Harrison, Encinitas, CA (US); James L. Melquist, Tempe, AZ (US)

(73) Assignee: McDonnell Douglas Helicopter Co., Mesa, AZ (US)

( * ) Notice: Subject to any disclaimer, the term of this patent is extended or adjusted under 35 U.S.C. 154(b) by 0 days.

(21) Appl. No.: 09/475,520

(22) Filed: Dec. 30, 1999

Related U.S. Application Data

(62) Division of application No. 08/687,246, filed on Jul. 25, 1996, now Pat. No. 6,056,846.

(51) Int. Cl.[7] .................................................. B32B 27/38
(52) U.S. Cl. ........................ 428/414; 428/339; 428/413; 428/423.1
(58) Field of Search ..................................... 428/413, 414, 428/423.1, 292.1, 297.4, 332, 339, 341, 213

(56) References Cited

U.S. PATENT DOCUMENTS

| | | |
|---|---|---|
| 3,501,564 | 3/1970 | Snoeyenbos et al. . |
| 4,250,136 | 2/1981 | Rex . |
| 4,287,014 | 9/1981 | Gaku et al. . |
| 4,374,890 * | 2/1983 | Shimizu et al. ..................... 428/212 |
| 4,701,378 | 10/1987 | Bagga et al. . |
| 4,780,507 * | 10/1988 | Gaku et al. .......................... 525/113 |
| 4,804,427 | 2/1989 | Paul et al. . |
| 4,861,649 | 8/1989 | Browne . |
| 5,034,256 | 7/1991 | Santiso, III et al. . |
| 5,167,870 | 12/1992 | Boyd et al. . |
| 5,338,594 | 8/1994 | Wang et al. . |
| 5,356,958 | 10/1994 | Matthews . |
| 5,359,023 | 10/1994 | Wang et al. . |
| 5,370,921 | 12/1994 | Cedarleaf . |
| 5,840,829 * | 11/1998 | Hermansen et al. ................. 528/363 |

FOREIGN PATENT DOCUMENTS 580037  7/1959  (CA) .

* cited by examiner

*Primary Examiner*—Blaine Copenheaver
*Assistant Examiner*—Christopher Paulraj
(74) *Attorney, Agent, or Firm*—Alston & Bird LLP

(57) ABSTRACT

A composite structure is made by first furnishing a skin layer made of a composite material of quartz fibers embedded in an uncured cyanate ester-resin matrix. A transition layer of a first epoxy resin is applied to the skin layer. The skin structure including the skin layer and transition layer is cured at a first temperature and post cured at a second temperature greater than the first temperature. A bonding layer of a second epoxy resin is thereafter applied to the bonding surface of the transition layer, and a substrate is contacted to the exposed face of the bonding layer. The second epoxy resin is cured at a third temperature no greater than the first temperature.

9 Claims, 3 Drawing Sheets

BONDED COMPOSITE STRUCTURE AND ITS FABRICATION

CROSS-REFERENCE TO RELATED APPLICATIONS

This application is a division of U.S. application Ser. No. 08/687,246, filed Jul. 25, 1996 now U.S. Pat. No. 6,056,846.

BACKGROUND OF THE INVENTION

This invention relates to composite structures, and, more particularly, to the fabrication of a structure having a laminated skin structure bonded to a substrate.

Multilayer laminated composite structures are used in a variety of applications requiring high strength and low weight. For low and moderate temperature applications, the structures are typically made of light-weight composites of fibers embedded in an organic matrix. In some cases, substrates such as structural foams are bonded into the structures as well. Through careful selection of materials and processing, this composite-design approach offers the opportunity to optimize many of the properties of the structure.

Such structures are generally fabricated from a number of individual elements carefully selected to achieve the required performance objectives, and thereafter bonded together. Some or all of the components may initially be in an uncured state, so that curing and post-curing steps are used in the fabrication procedure. The curing and post-curing steps are performed by heating the structure according to a temperature-time schedule specified to cure and, optionally, post-cure the organic components of the composite material.

Although the final fabricated structure may have exceptional performance, the fabrication operation may present challenging problems. One of the ongoing obstacles to the fabrication of laminated composite structures is a consequence of the differing coefficients of thermal expansion of the constituents of the composite material. For example, if two components having differing coefficients of thermal expansion are bonded together and then heated to elevated temperature for curing, thermal strains and stresses are created within the cured structure upon cooling. When there are multiple components with anisotropic coefficients of thermal expansion, the internal strains and stresses are even more complex. Internal strains and stresses can arise in other ways as well.

Whatever their origin, the internal strains and stresses usually have adverse effects on the performance of the composite material. They often cause deterioration of the bonds between the components and laminates. The deterioration is manifested in lower measured property values than would be otherwise expected, and/or by observed bond line failure mechanisms. There may also be a shifting of the ultimate stress between the two dissimilar materials to a lower strength, more remote surface.

In a specific case of interest to the inventors, an aircraft structural member is fabricated by preparing a skin structure sub-assembly made of a precured quartz fiber/cyanate ester resin laminate and bonding the skin structure sub-assembly to a substrate sub-assembly formed of a low density (less than 25 pounds per cubic foot), surface-sealed syntactic foam, using an epoxy structural adhesive. This composite structure is observed to preferentially fail at the quartz fiber/cyanate ester resin interface. In many instances, failure occurred as the structure was cooled from the fabrication temperature to room temperature. Other bonded assemblies survived for a time at room temperature, but later failed catastrophically at the quartz fiber/cyanate ester resin interface. This failure mechanism indicates that the full strength potential of the skin structure and the syntactic foam is not realized because of the high stress developed as a result of the differences in the coefficients of thermal expansion of the two bonded sub-assemblies.

There is a need for an improved fabrication technique for such laminated composite structures. The present invention fulfills this need, and further provides related advantages.

SUMMARY OF THE INVENTION

The present invention provides a fabrication technique for preparing a composite structure, and a composite structure prepared by the method. The strength of the structure according the invention is superior to that made by prior techniques. Failure of the structure in shear occurs in the syntactic foam, so that the strength potentials of the components are more nearly achieved. The finished composite structure differs from that according to the prior approach, but the difference is compatible with the overall requirements of the structure and also compatible with the processing required to otherwise achieve optimal properties of the structure.

In accordance with the invention, a method for making a composite structure includes furnishing a skin layer having a skin-layer surface and comprising a composite material of quartz fibers embedded in an uncured cyanate ester-resin matrix. The cyanate ester-resin matrix is curable at a first temperature and post-curable at a second temperature greater than the first temperature. The method further includes applying to the uncured skin-layer surface a transition layer of a first epoxy resin adhesive system, leaving an exposed transition-layer bonding surface. The skin layer and the transition layer together comprise a skin structure. The first epoxy resin adhesive system is curable at the first temperature and post-curable at the second temperature. The skin structure is cured at the first temperature and post-cured at the second temperature. Next, a bonding layer of a second epoxy resin adhesive system is applied to the exposed transition-layer bonding surface of the skin structure, leaving an exposed face of the bonding layer. The second epoxy resin adhesive system is curable at a third temperature no greater than the first temperature, and which is preferably the same as the first temperature. The method includes contacting a substrate to the exposed face of the bonding layer, and thereafter curing the second epoxy resin adhesive system at the third temperature.

More generally, a method for making a composite structure comprises the steps of furnishing a skin layer having a skin-layer surface and comprising a composite material of fibers embedded in an uncured organic matrix, wherein the matrix is curable at a first temperature and post-curable at a second temperature greater than the first temperature. A transition layer of a first curable resin is applied to the skin-layer surface, leaving an exposed transition-layer bonding surface. The first curable resin is curable at the first temperature and post-curable at the second temperature. The skin layer and the transition layer together comprise a skin structure. The skin structure is cured at the first temperature and post-cured at the second temperature. Next, a bonding layer of a second curable resin, curable at a third temperature no greater than the first temperature, is applied to the exposed transition-layer bonding surface of the skin structure, leaving an exposed face of the bonding layer. A substrate is contacted to the exposed face of the bonding layer, and thereafter the second curable resin is cured at the third temperature.

A composite structure according to the present invention comprises a skin layer having a skin-layer surface and comprising a composite material of fibers embedded in a matrix. The matrix is a cured form of a matrix precursor curable at a first temperature and post-curable at a second temperature greater than the first temperature. A transition layer of a co-cured and interdiffused first adhesive resin and the skin-layer matrix contacts the skin-layer surface. The first adhesive resin is a cured form of a first adhesive resin precursor curable at the first temperature and post-curable at the second temperature. A bonding layer of a second adhesive resin contacts and is bonded to the transition layer at a bonding surface, but is not substantially interdiffused therewith. The second adhesive resin is a cured form of a second adhesive resin precursor curable at a third temperature that is no greater than the first temperature. A substrate is bonded to the bonding layer.

Common to all of these approaches is the application of a transition layer of a first curable resin to the skin layer, prior to its curing. In the preferred approach, the transition layer is an epoxy resin that is curable and post-curable at the same temperatures as the skin structure. This transition is cured and post-cured with the skin layer. The pre-cured skin layer is thereafter bonded to the substrate with an adhesive, preferably the same or a different epoxy resin, and the adhesive is cured.

It is found that this approach, as distinct from an alternative technique wherein no transition layer is used, produces improved results and increased failure strengths. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
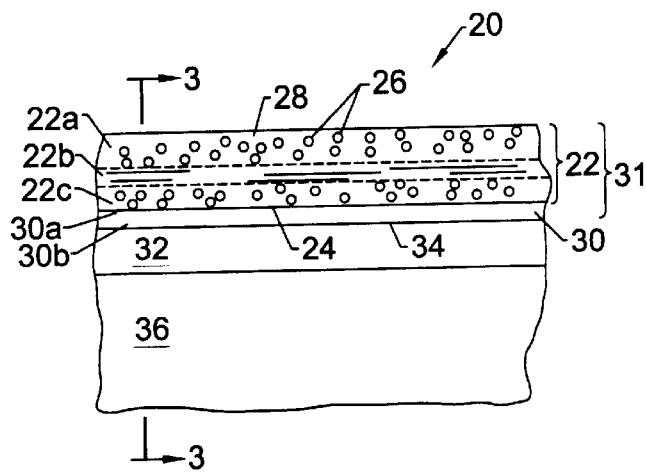
FIG. 1 is a schematic sectional view of a composite structure prepared by the present approach.
Figure 5:
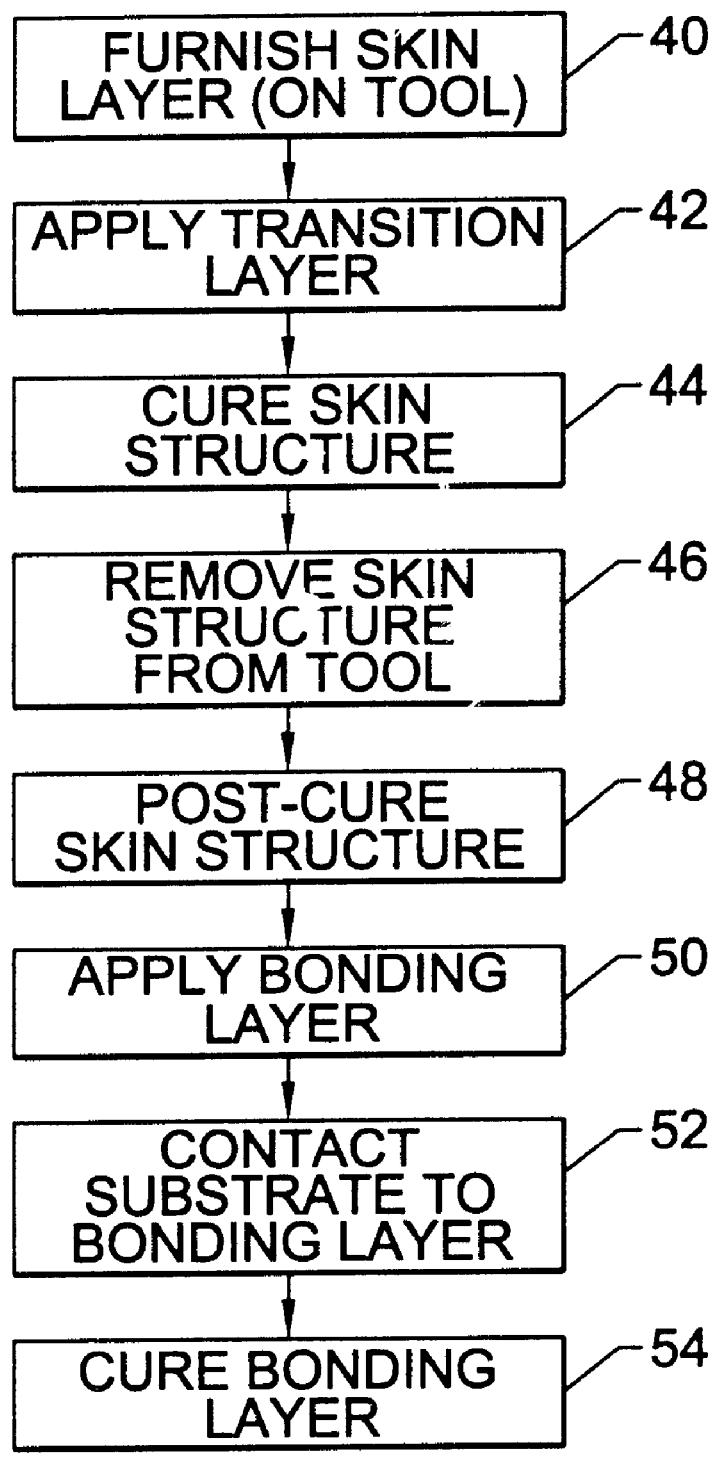
FIG. 5 is a block flow diagram of a method for practicing the invention.

FIG. 1 illustrates a composite structure 20 made according to the present approach, and FIG. 5 depicts a preferred fabrication procedure used to prepare the composite structure. The composite structure 20 comprises a skin layer 22 having a skin-layer surface 24. The skin layer 22 is preferably formed of quartz fibers 26 embedded in a cyanate ester-resin matrix 28. The quartz fibers 26 typically have a diameter of about 9–14 micrometers.

Figure 6:
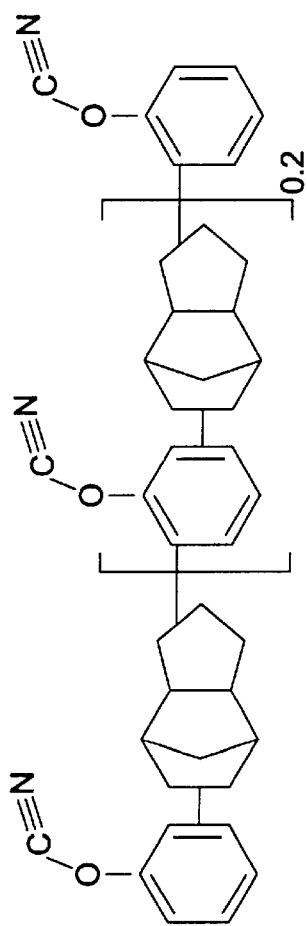
FIG. 6 is a schematic description of an oligomeric cyanate ester pre-polymer.
Figure 7:
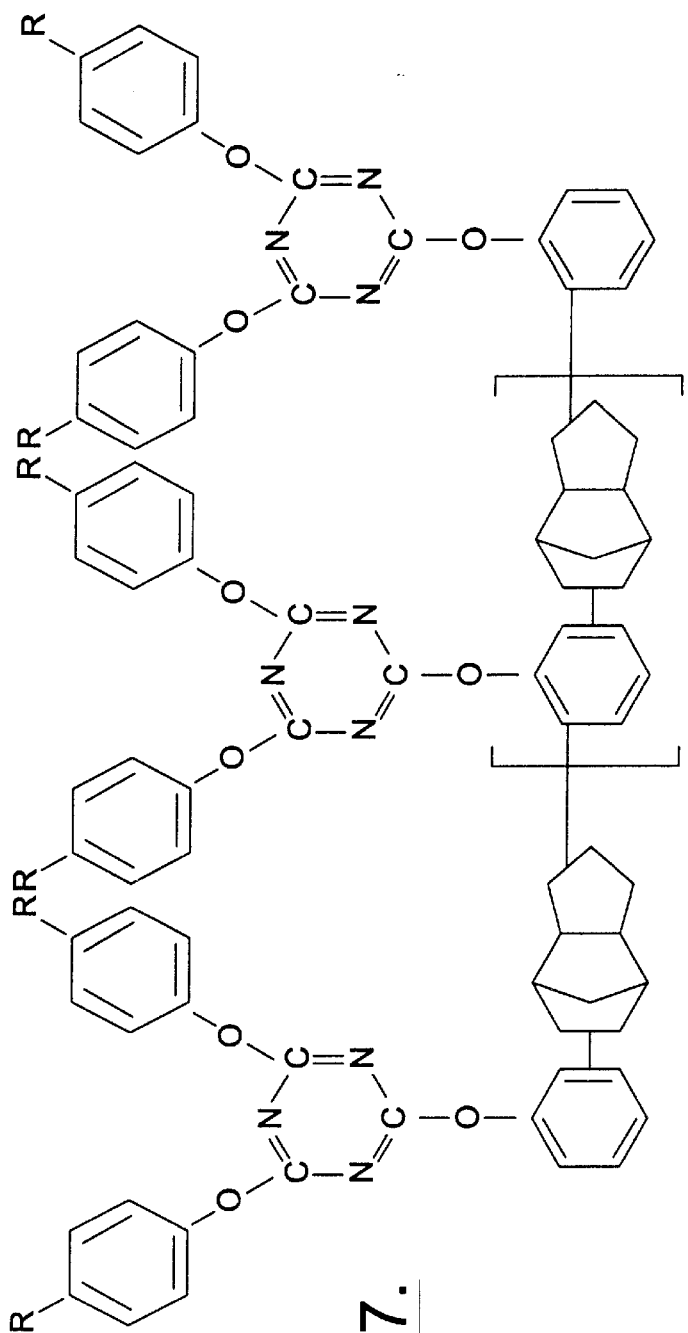
FIG. 7 is a schematic description of a polymerized cyanate based upon the oligomeric cyanate ester pre-polymer of FIG. 6.

The preferred uncured cyanate ester-resin matrix 28 comprises a pre-polymer which has an apparent glass-transition temperature of from about 40° F. to about 60° F., which has a high viscosity of greater than $10^6$ centipoise at ambient temperature, and which exhibits a viscosity versus temperature profile which minimizes at a low value of about 100 centipoise at a temperature of about 300° F. when continuously heated at a constant rate of about 18° F. per minute from ambient temperature. The preferred pre-polymer contains phenylene cyanate ester reactive groups. The structure of the unpolymerized oligomeric cyanate ester pre-polymer is depicted in FIG. 6, and the polymerized polycyanate is depicted in FIG. 7. The pre-polymer has a large number of isomerically dissimilar components resulting in a permanent non-crystalline crystal nature in the uncured polymer. The pre-polymer is also available in a toughened form wherein colloidally dispersed elastomers are mixed into the pre-polymer. The elastomer particles are encapsulated with a polymeric hard shell, such as a polystyrene or ABS-styrene copolymer. Such a toughened pre-polymer form is available commercially from Dow Chemical. The untoughened and toughened forms may be mixed together. Such a system is available commercially from YLA, Incorporated, Benecia, Calif, as the RS-3 system. This cyanate ester is curable at a temperature of about 350° F. and post-curable at a temperature of about 425° F.

The skin layer 22 may be formed of a single layer or it may have multiple sublayers (sometimes termed "plies"). Here, the skin layer 22 is depicted as including three sublayers 22a, 22b, and 22c. In a typical case, the skin layer 22 is about 0.030 inches thick, but this dimension is presented by way of illustration and not of limitation.

A transition layer 30 contacts the skin-layer surface 24 of the skin layer 22. The transition layer 30 is an interdiffused mixture of a first cured resin, preferably an epoxy resin, and the cyanate ester resin of the matrix. A region 30a of the transition layer 30 closest to the skin-layer surface 24 has a relatively larger proportion of the cyanate ester resin, and a region 30b of the transition layer 30 furthest from the skin-layer surface 24 has a relatively smaller (and typically nearly zero) proportion of the cyanate ester resin. The transition layer 30 is preferably from about 0.005 to about 0.008 inch thick. The mixture of the first epoxy resin and the cyanate ester resin is initially uncured (i.e., not cured at all or partially cured) during fabrication, and is subsequently cured during processing. The first epoxy resin is selected to be co-reactive with the cyanate ester resin material, and to be curable and post-curable at the same temperatures as the cyanate ester resin material. In a preferred case, the first epoxy resin is an epoxy-resin-based adhesive system, which is available commercially as FM355 material from Cytec Corp., and which is suitable for use at 425° F., the post curing temperature of the cyanate matrix. This material is characterized by a flatwise tension strength tested with non-metallic substrates of 1000 pounds per square inch (psi) at 75° F. and 800 psi at 350° F., and good stability to oxidation at elevated temperatures.

The thickness of the transition layer 30 depends upon the relative interdiffusion rates of both the first resin material and the cyanate skin matrix components. The first resin material and the cyanate skin matrix material interdiffuse when in contact and during heating to the curing temperature. As the curing reaction proceeds, the interdiffusion rates are affected by the ever-increasing viscosity (at the pertinent temperature and time) of the curing materials and their mixtures. In a typical case, the transition layer 30 is about 0.005 inches thick, but this dimension is presented by way of illustration and not of limitation. The skin layer 22 and the transition layer 30 are together termed a skin structure 31.

A bonding layer 32 of a second cured resin, preferably an epoxy resin, contacts a bonding surface 34 of the transition layer 30 that is remote from the skinlayer surface 24. The second epoxy resin may be selected to be curable at a curing temperature equal to or less than the curing temperature and less than the post-curing temperature of the first epoxy resin and the cyanate ester resin. There is substantially no interdiffusion of the bonding layer 32 into the previously cured transition layer 30, in contrast to the interdiffusion between the cyanate ester resin matrix of the fiber composite material and the first epoxy resin which occurs in the transition layer 30. This substantial absence of interdiffusion, except for a very minor amount locally at the bonding surface 34, results from the fact that the skin structure is pre-cured prior to contacting it to the bonding layer. In a preferred case, the second epoxy resin is an epoxy-resin-based adhesive system, which is available commercially as FM300 epoxy available from Cytec Corp. This material is characterized by a flatwise tension strength tested with non-metallic substrates of 700 pounds per square inch (psi) at 75° F. and 345 psi at 300° F. In a typical case, the bonding layer 32 is about 0.013–0.015 inch thick, but these dimensions are presented by way of illustration and not of limitation.

In this preferred case, the first cured resin and the second cured resin are selected to be different materials but chemically similar so that they bond well to each other in the second curing operation. The preferred first cured resin has a higher curing temperature and a higher-temperature mechanical capability than the preferred second cured resin, but both are epoxies that bond well to each other. This selection permits the curing and post-curing temperatures of the skin structure to be higher than the curing temperature of the subsequently cured bonding layer, a useful capability for some materials combinations such as the preferred materials used in the present approach. However, the first cured resin and the second cured resin may be the same material, so that the curing temperatures are the same. In this case, however, more care must be taken to ensure that the curing of the second resin material does not result in over-curing of the first resin material and the matrix of the composite material in the skin structure.

A substrate 36 is bonded to the bonding layer 32. This bonding is achieved by the adhesive effect of the cured resin of the bonding layer 32. In a preferred case, the substrate 36 is a surface sealed, partially open-cell, low-density (less than 25 pounds per cubic foot) syntactic foam formed of glass microballoons embedded in a polyetherimide resin matrix such as Ultem 1010 and incorporating a significant amount of interconnected open cells containing air.

FIG. 5 illustrates the preferred method of preparing the composite structure 20. The skin layer 22 is furnished, numeral 40. The skin layer 22 is preferably prepared by providing individual sublayers of the composite material of the quartz fibers embedded in the uncured cyanate ester-resin matrix. Such sublayers are available commercially as "prepreg") material. As used herein, "uncured") means that a curable material, here the cyanate ester-resin matrix, is not fully cured to its final cured state. There is a substantial amount of curing necessary to achieve an adequate state of cure to allow disassembly from the mold after cooling. The prepreg material containing such an uncured matrix material can therefore be formed or molded to shape. The first sublayer 22a is placed against a piece of tooling, the second sublayer 22b is placed over the first sublayer 22a, and the third sublayer 22c is placed over the second sublayer 22b. This progressive fabrication is termed "layup"). The tooling defines the shape of the composite structure 20, and it is later removed.

The transition layer 30 is applied to the skin-layer surface 24 of the skin layer 22, numeral 42. The material of the transition layer is preferably provided as an uncured film adhesive layer of a curable precursor of the first epoxy resin. Such film adhesive layers are available commercially from numerous manufacturers, including, for example, Cytec Corp., with a backing that permits easy handling. The backing is stripped away when the film adhesive layer is applied to the surface.

The skin structure 31 is cured, numeral 44. Curing is accomplished with the skin structure in contact with the tooling and under pressure, so that the shape of the cured skin structure is well defined. Curing is accomplished under a curing schedule that is suitable for the matrix of the skin layer and also for the first epoxy resin of the transition layer. For example, the curing schedule for the preferred cyanate ester resin is about 350° F. with an applied pressure of about 25–100 psi, for about 2 hours.

During the time that the uncured first epoxy resin of the transition layer 30 contacts the uncured cyanate ester resin of the skin layer 22, prior to the beginning of the curing operation and during the initial stages of the curing operation, there is an interdiffusion of material between the two layers 22 and 30. Thus, as discussed previously, in the region 30a the cyanate ester resin and the first epoxy resin intermix and co-react. The result, after curing, is a gradual transition from pure cured cyanate ester resin in the skin layer 22, to a co-reacted and bonded mixture of cyanate ester resin and first epoxy resin in the region 30a, to nearly pure cured first epoxy resin in the region 30b. During later processing, the first epoxy resin of the region 30b bonds to the second epoxy resin of the bonding layer 32, resulting in a strongly bonded, stable bond structure of the skin layer 22 to the substrate 36.

The skin structure 31 is removed from the tooling, numeral 46, and postcured, numeral 48, where post-curing is recommended for the cyanate ester resin of the skin layer 22 (which is the case for the preferred cyanate ester resin). For example, the post-curing schedule for the preferred cyanate ester resin is about 90 minutes at about 425° F., freestanding.

The bonding layer 32 is applied to the exposed bonding surface 34 of the transition layer 30, numeral 50. The material of the bonding layer is preferably provided as an uncured film adhesive layer of a curable precursor of the second epoxy resin. Such film adhesive layers are available commercially from Cytec Corp., with a backing that permits easy handling. The backing is stripped away when the film adhesive layer is applied to the surface.

The substrate 36 is provided and contacted to the bonding layer 32. In the preferred case, the substrate 36 is a precured piece of a syntactic foam material that is prepared and shaped according to techniques well known in the art, and which do not form a part of the present invention. The bonding layer 32 acts as the adhesive that holds the substrate 36 to the previously prepared structure.

The bonding layer 32 is cured, numeral 54, according to a curing schedule specified for the second epoxy material. During curing, the second epoxy material of the bonding layer 32 hardens internally and also bonds in a permanent manner to the transition layer 30, primarily to the first epoxy material, which is the principal constituent of the region 30b. The bond between the first epoxy and the second epoxy is stronger than a bond which would be formed between the second epoxy and the cyanate ester resin of the skin layer, because of their similar chemical natures. 32, and 36 according to the curing schedule specified for the second epoxy. In the case of the preferred second epoxy, the preferred curing schedule is about 120 minutes at about 350° F. under pressure. As noted previously, there is little substantially no, interdiffusion of the bonding layer 32 into the previously cured transition layer 30, because the pre-cured transition layer is already hardened and resistant to interdiffusion. However, the two epoxies bond well to each other.

Figure 2:
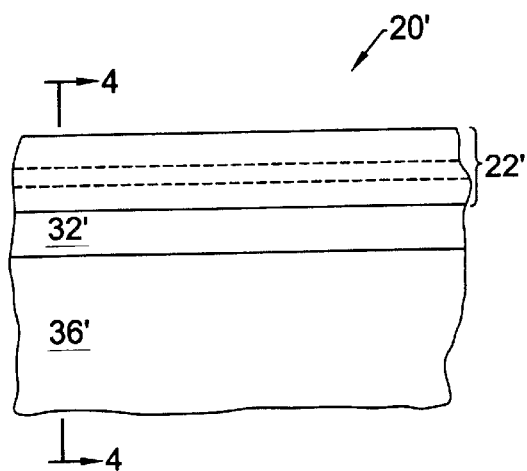
FIG. 2 is a schematic sectional view of another approach for preparing a composite structure, not in accordance with the invention.

The present approach described in relation to FIGS. 1 and 5 may be contrasted with an alternative approach which produces a composite structure 20' shown in FIG. 2, which is not within the scope of the invention. Because of the similarity of the structures 20 and 20' in some respects, corresponding numerals are used in FIG. 2 to denote the structural elements that are common with those ill FIG. 1, except that a prime (') is affixed thereto. The skin layer 22', bonding layer 32', and substrate 36' of FIG. 2 are substantially similar to their counterparts in FIG. 1. The principal difference is that the bonding layer 32 directly contacts the precured skin layer 22', rather than having the transition layer 30 between the bonding layer 32 and the skin layer 22. Stated another way, the composite structure 20' is prepared by the method of FIG. 5, except that the step 42 of applying the transition layer is omitted.

Figure 3:
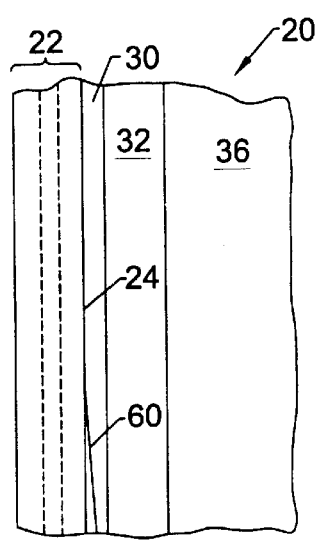
FIG. 3 is a schematic sectional view, taken along lines 3—3, of the failure mechanism of the composite structure of FIG. 1.
Figure 4:
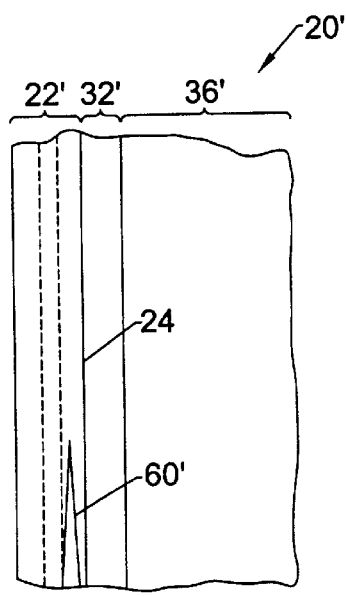
FIG. 4 is a schematic sectional view, taken along lines 4—4, of the failure mechanism of the composite structure of FIG. 2.

FIGS. 3 and 4 illustrate the practical effect of the different composite structures 20 and 20' on the mechanical performance of the composite structures. When the composite structure 20 or 20' is loaded in shear loading between the skin layer 22 and the substrate 36, to the point that it begins to fail, a crack 60 (FIG. 3) or 60' (FIG. 4) is initiated and begins to propagate through the structure. In the composite structure 20' not in accordance with the invention, testing has shown that the crack propagates at the quartz fiber/cyanate resin interface within the skin layer 22'. A typical failure single-lap shear strength is about 800 psi, when the preferred materials are used to prepare this type composite structure 20'.

By contrast, for the approach of the present invention, FIG. 3, the crack propagates in the transition region 30 but not at the quartz fiber/cyanate resin interfaces of the skin layer 22. Microscopic studies of the fracture surface show integrity of the fiber bundles with no fraying or breaking of individual fibers as is the case with the non co-cured composite structure. This change in failure mode is attributable to the tougher, more compliant material in the co-cured composite material. The transition region presents a more diffuse transition than the sharp interface between the quartz fiber and the cyanate resin. That transition was formed as an integrally cured structure, because the transition layer 30 was interdiffused with and co-cured with the skin layer 22. Additionally, the region of crack propagation reflects a gradual transition between cyanate ester resin of the skin layer 22 and the chemically different structure and different coefficient of thermal expansion of the first epoxy resin of the transition layer 30. The combination of these features results in a higher failure single-lap shear strength of about 1500 psi.

The relatively minor difference in structure of the addition of the transition layer prior to curing of the skin structure thus results in significantly improved performance of the final composite structure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A composite structure, comprising:
   a skin layer having a skin-layer surface and comprising a composite material of fibers embedded in a cyanate ester resin matrix, the cyanate ester matrix being a cured form of a matrix precursor curable at a first temperature and post-curable at a second temperature greater than the first temperature;
   a transition layer of a cured first epoxy resin, said first epoxy resin being co-cured and interdiffused with said cyanate ester resin and being a cured form of a first epoxy resin precursor curable at the first temperature and post-curable at the second temperature;
   a bonding layer of a second epoxy resin contacting and bonded to the transition layer at a bonding surface, the second epoxy resin being a cured form of a second epoxy resin precursor curable at a third temperature that is no greater than the first temperature; and
   a substrate bonded to the bonding layer.

2. The composite structure of claim 1, wherein the composite material comprises quartz fibers in the cyanate ester-resin matrix.

3. The composite structure of claim 1, wherein the second epoxy resin is different from the first epoxy resin.

4. The composite structure of claim 1, wherein the first epoxy resin and the second epoxy resin are the same material.

5. The composite structure of claim 1, wherein the substrate is a syntactic foam material.

6. The composite structure of claim 1, wherein the transition layer has a thickness of from about 0.005 to about 0.008 inch.

7. The composite structure of claim 1, wherein the bonding layer has a thickness of from about 0.013 to about 0.015 inch.

8. The composite structure of claim 1, wherein said transition layer further includes a first region adjacent the skin layer and a second region adjacent the bonding layer, said first region having a larger proportion of cyanate ester resin than said second region.

9. A composite structure, preparing by the method of:
   furnishing a skin layer having a skin-layer surface and comprising a composite material of fibers embedded in an uncured cyanate ester-resin matrix, wherein the cyanate ester-resin matrix is curable at a first temperature and post-curable at a second temperature greater than the first temperature;
   applying a transition layer of a first epoxy resin adhesive system to the skin-layer surface, leaving an exposed transition-layer bonding surface, the skin layer and the transition layer interdiffusing to form a skin structure, wherein the first epoxy resin adhesive system is curable at the first temperature and post-curable at the second temperature;
   curing the skin structure at the first temperature thereby coreacting the cyanate ester resin and first epoxy resin;
   post curing the skin structure at the second temperature;
   applying a bonding layer of a second epoxy resin adhesive system to the exposed transition-layer bonding surface of the skin structure, wherein the second epoxy resin adhesive system is curable at a third temperature no greater than the first temperature, leaving an exposed face of the bonding layer;
   applying a substrate to the exposed face of the bonding layer; and thereafter
   curing the second curable resin at the third temperature.

* * * * *